United States Patent
Baldemair et al.

(10) Patent No.: US 11,979,885 B2
(45) Date of Patent: May 7, 2024

(54) EXTENDED PHYSICAL DOWNLINK CONTROL CHANNEL MONITORING

(71) Applicant: Telefonaktiebolaget LM Ericsson (publ), Stockholm (SE)

(72) Inventors: Robert Baldemair, Solna (SE); Andres Reial, Lomma (SE); Ali Nader, Malmö (SE); Sina Maleki, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 450 days.

(21) Appl. No.: 17/288,771

(22) PCT Filed: Nov. 1, 2019

(86) PCT No.: PCT/EP2019/079952
§ 371 (c)(1),
(2) Date: Apr. 26, 2021

(87) PCT Pub. No.: WO2020/089449
PCT Pub. Date: May 7, 2020

(65) Prior Publication Data
US 2021/0400703 A1     Dec. 23, 2021

Related U.S. Application Data

(60) Provisional application No. 62/754,422, filed on Nov. 1, 2018.

(51) Int. Cl.
*H04W 72/23* (2023.01)
*H04L 5/00* (2006.01)
*H04W 48/12* (2009.01)

(52) U.S. Cl.
CPC ........... *H04W 72/23* (2023.01); *H04L 5/0055* (2013.01); *H04W 48/12* (2013.01)

(58) Field of Classification Search
None
See application file for complete search history.

(56) References Cited

U.S. PATENT DOCUMENTS

| | | | | |
|---|---|---|---|---|
| 2013/0003663 A1* | 1/2013 | Blankenship | ......... | H04L 1/0004 370/329 |
| 2014/0050191 A1* | 2/2014 | Kim | ...................... | H04L 5/0048 370/329 |

(Continued)

OTHER PUBLICATIONS

International Search Report and Written Opinion dated Jan. 27, 2020 for International Application No. PCT/EP2019/079952 filed Nov. 1, 2019, consisting of 10-pages.

(Continued)

*Primary Examiner* — Hong S Cho
(74) *Attorney, Agent, or Firm* — Sage Patent Group

(57) ABSTRACT

A method, network node and wireless device (WD) for extended physical downlink control channel (PDCCH) monitoring are disclosed. According to one aspect, a method includes receiving a triggering signal, configured to trigger a search space expansion in the WD. The method also includes, when the triggering signal fulfills predetermined criteria, performing a search space expansion, the at least one predetermined criteria being based at least in part on at least one of physical downlink control channel, PDCCH, characteristics, physical uplink shared channel, PUSCH, characteristics and physical downlink shared channel, PDSCH, characteristics.

21 Claims, 8 Drawing Sheets

(56) References Cited

U.S. PATENT DOCUMENTS

2014/0119335 A1* 5/2014 Wang .................... H04L 1/0072
  370/329
2017/0264417 A1* 9/2017 Eriksson ............... H04L 5/0053
2017/0331670 A1 11/2017 Parkvall et al.

OTHER PUBLICATIONS

3GPP TS 38.213 V16.0.0; 3rd Generation Partnership Project; Technical Specification Group Radio Access Network; NR; Physical layer procedures for control (Release 16), Dec. 2019, consisting of 146-pages.

* cited by examiner

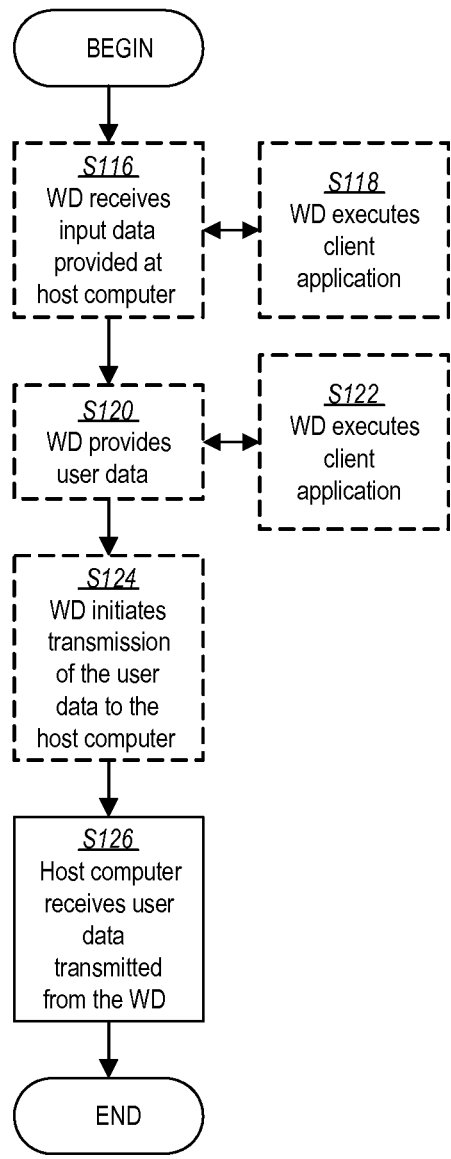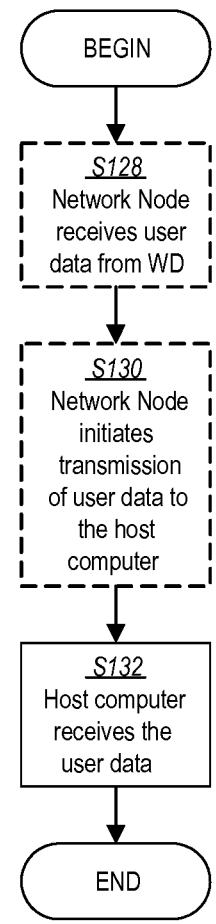
FIG. 7
FIG. 8

EXTENDED PHYSICAL DOWNLINK CONTROL CHANNEL MONITORING

CROSS-REFERENCE TO RELATED APPLICATIONS

This application is a Submission Under 35 U.S.C. § 371 for U.S. National Stage Patent Application of International Application No.: PCT/EP2019/079952, filed Nov. 1, 2019 entitled "EXTENDED PHYSICAL DOWNLINK CONTROL CHANEL MONITORING," which claims priority to U.S. Provisional Application No. 62/754,422, filed Nov. 1, 2018, entitled "EXTENDED PHYSICAL DOWNLINK CONTROL CHANNEL MONITORING," the entireties of both of which are incorporated herein by reference.

FIELD

The present disclosure relates to wireless communications, and in particular, to extended physical downlink control channel (PDCCH) monitoring.

BACKGROUND

PDCCH and Downlink Control Information (DCI) in New Radio (NR)

New Radio (NR) (also referred to as Fifth Generation or "5G"), is a wireless communication system specified by standards developed by the Third Generation Partnership Project (3GPP). In NR, Downlink Control Information (DCI) is sent on the Physical Downlink Control Channel (PDCCH). The DCI typically contains downlink (DL) and uplink (UL) scheduling commands but can also contain other commands such as commands for power control. The DCI includes a payload part which is complemented with a Cyclic Redundancy Check (CRC). Since the DCI is sent on the PDCCH, which is received by multiple terminals, an identifier identifying the targeted wireless device (WD) needs to be included. In NR, this is done by scrambling the CRC with a Radio Network Temporary Identifier (RNTI) which is assigned to the WD. Most commonly, the C-RNTI is used to schedule a unicast transmission to the WD. In NR, a WD can be configured with other RNTIs as well. Depending on the payload content, different DCIs can be distinguished. In NR, for DL scheduling, a compact DCI 1-0 and a larger DCI 1-1 are used; for UL a compact DCI 0-0 and a larger DCI 0-1 are used. In addition, other DCI formats are specified for other special purposes such as power control.

The payload together with scrambled CRC is encoded and transmitted on the PDCCH. The WD tries to detect a PDCCH using multiple hypotheses with respect to payload size and location in the time-frequency grid based on its configured search spaces. Once the WD decodes a DCI it de-scrambles the CRC with RNTI(s) that are monitored for the search space within which the PDCCH has been decoded; in case of a match, the WD considers the detected DCI addressed to itself and follows the instructions in the DCI.

The PDCCH is transmitted in a so-called search space. A search space is a collection of possible time-frequency resource element hypotheses that can be used for PDCCH transmission by a base station (e.g., a gNodeB (gNB)) and the WD needs to blindly test the possible resource element hypothesis of its configured search space(s). The different hypotheses can contain the same amount or a different amount of resource elements. The amount of resource elements used is denoted the aggregation level. By varying the aggregation level, PDCCH can be made more or less robust for a certain payload size, i.e., PDCCH link adaptation can be performed by adjusting the aggregation level. A search space can either be WD specific or common. A WD specific search space is dedicatedly configured to a WD while a common search space is configured to and monitored by multiple WDs. A common search space can carry both broadcast messages (identified by an RNTI configured to multiple WDs, such as the system information RNTI (SI-RNTI)) but also WD-specific DCI if scheduled using a WD-specific RNTI such as the C-RNTI.

In NR, a search is configured via a control resource set (CORESET) (frequency-domain resources and time duration) as well as placement in time plus other information, e.g., aggregation level, DCI format, etc. The CORESET is configured via a radio resource control (RRC) information element (IE) and the time placement, as well as by other parameters (DCI formats, aggregation level, common/WD specific search space) in another RRC information element.

In RRC_CONNECTED mode, the WD monitors the PDCCH for scheduled physical downlink shared channel (PDSCH) transmissions and physical uplink shared channel (PUSCH) transmission and for other purposes. From Long Term Evolution (LTE), a currently extant wireless communication system being upgraded to and replaced by NR, it is known, depending on a discontinuous reception (DRX) setting, that a WD may spend a substantial part of its energy on decoding the PDCCH without detecting a PDSCH/PUSCH scheduled to the WD. The situation can be similar in NR if a similar DRX setting with traffic modelling is utilized, as the WD needs to perform blind detection in its configured search spaces to identify whether there is a PDCCH sent to it, and act accordingly.

On one hand, frequent (e.g., every slot) PDCCH monitoring occasions are desirable since this allows high data throughput (a WD can be scheduled in every slot) and also contributes to achieving low latency. On the other hand, frequent PDCCH monitoring occasions without PDSCH/PUSCH often being scheduled implies that a lot of energy is consumed for PDCCH decoding without actually being scheduled.

It has been considered that the WD automatically extend its configured PDCCH monitoring occasions with a new PDCCH monitoring occasion (e.g., in the next slot) when the WD has been scheduled with a PDSCH/PUSCH in the previous slot. This extension is especially useful if a WD is not configured with PDCCH monitoring occasions in every slot. FIG. 1 and FIG. 2 show examples where a WD is configured with PDCCH monitoring occasions every 4-th slot and dynamically inserts a search space since it has been scheduled. FIG. 1 shows that a PDCCH monitoring occasion is dynamically created in slot n+1 in response to a received PDCCH in slot n. In this option, the originally configured PDCCH monitoring occasions maintain their position (Slot n+4). FIG. 2 shows that a PDCCH monitoring occasion is dynamically created in slot n+1 in response to a received PDCCH in slot n. In this option, the originally configured PDCCH monitoring occasions are shifted/restarted according to the original periodicity after the last monitored PDCCH; I.e. Slot n+1+4 in the figure.

The general principle of extending the PDCCH monitoring occasions upon receiving a data-scheduling DCI can be conceptually implemented by employing the connected mode DRX (CDRX) framework. If the CDRX on-duration is limited to a single PDCCH search space occasion, the inactivity timer may be started for the duration of one or more occasions to allow extended monitoring.

While the CDRX approach allows implementing the monitoring occasion extension, using the CDRX mechanism for search space occasion-level management and extension, the mechanism is hijacked from its typical, longer WD DRX control. A single monitoring occasion is not how the CDRX is typically configured—it would only give the network a single occasion for data scheduling to a given WD.

Thus, there are still problems associated with PDCCH monitoring occasions without interfering with the longer-term WD DRX control provided by the CDRX mechanism. Not many details have been discussed in 3GPP standards meetings of a method to extend PDCCH monitoring occasions with an extra monitoring occasion in the next slot when a PDCCH scheduling PDSCH/PUSCH has been received in a previous monitoring occasion.

No specifics about how and when such additional PDCCH monitoring occasions are created have been promulgated. The practice of adding one fixed additional monitoring occasion in a next slot may be limiting for the scheduler. More flexibility is desired to fully leverage extension of the PDCCH monitoring occasion into the next slot after receipt of a PDCCH message that schedules a PDSCH or PUSCH. Finally, the extension of the PDCCH occasions may lead to WD-network (NW) misalignment if the NW, such as by a network node, uses additional scheduling opportunities when the WD has failed to receive the first PDCCH.

SUMMARY

Some embodiments advantageously provide methods, network nodes, and wireless devices for extended physical downlink control channel (PDCCH) monitoring. A few non-limiting aspects are provided.

Aspect 1: To obtain a better control of when a new search space is dynamically added to the next slot in some embodiments, to perform such an extension only when the scheduling PDCCH or the PDSCH/PUSCH meets certain properties (e.g., which search space, CORESET, DCI, AL, RNTI, how large has the scheduled PUSCH/PDSCH been).

Aspect 2: The number of extended occasions upon scheduled data in the first occasion may be configured to be more than one, via static or dynamic configuration. The spacing of the extension occasions may also be controlled to be other than the immediately following slot.

Aspect 3: In order to avoid NW-UE misalignment in case of missed PDCCH reception in the first monitoring occasion, the extension may be configured to start only after the WD has transmitted an acknowledgement (ACK) for the first PDSCH transmission which serves as a confirmation of extended monitoring by the WD.

According to one aspect, a network node configured to communicate with a WD is provided. The network node includes processing circuitry configured to configure a triggering signal to conditionally trigger a search space expansion in the WD such that the triggering signal fulfills at least one predetermined criterion that is based at least in part on at least one of PDCCH characteristics, PUSCH characteristics and PDSCH characteristics. A radio interface in communication with the processing circuitry is configured to transmit the triggering signal.

According to this aspect, in some embodiments, the triggering signal is included in a PDSCH using medium access control, MAC, control elements, CE, to control start or stop of a search space expansion. In some embodiments, the at least one predetermined criterion is based at least in part on a PDCCH scrambled by a predetermined radio network temporary identifier, RNTI. In some embodiments, the network node is further configured to use scheduling time offsets to one of: inform the WD about upcoming activity in time; and to cause the WD to perform search space expansion in one or more upcoming slots. In some embodiments, the triggering signal is a PDCCH that has at least one bit to indicate to the WD when to start or stop a search space expansion. In some embodiments, the triggering signal is a PDCCH that uses a bit field to activate a remaining search space.

According to another aspect, a method implemented in a network node includes configuring a triggering signal to conditionally trigger a search space expansion in the WD such that the triggering signal fulfills at least one predetermined criterion that is based at least in part on at least one of PDCCH characteristics, PUSCH characteristics and PDSCH characteristics, and transmitting the triggering signal.

According to this aspect, in some embodiments, the transmitting of the triggering signal is in a PDSCH that uses medium access control, MAC, control elements, CE, to control start or stop of a search space expansion. In some embodiments, the at least one predetermined criterion is based at least in part on a PDCCH scrambled by a predetermined radio network temporary identifier, RNTI. In some embodiments, the method further includes using scheduling time offsets to one of inform the WD about upcoming activity in time and to cause the WD to perform search space expansion in one or more upcoming slots. In some embodiments, the triggering signal is a PDCCH that has at least one bit to indicate to the WD when to start or stop a search space expansion. In some embodiments, the triggering signal is a PDCCH that uses a bit field to activate a remaining search space.

According to yet another aspect, a WD is configured to communicate with a network node. The WD includes a radio interface configured to receive a triggering signal configured to trigger a search space expansion in the WD. The WD also includes processing circuitry in communication with the radio interface. The processing circuitry is configured to: when the triggering signal fulfills at least one predetermined criterion, perform a search space expansion, the at least one predetermined criterion being based at least in part on at least one of physical downlink control channel, PDCCH, characteristics, physical uplink shared channel, PUSCH, characteristics and physical downlink shared channel, PDSCH, characteristics.

According to this aspect, in some embodiments, the at least one predetermined criterion is based at least in part on a PDCCH scrambled by a predetermined radio network temporary identifier, RNTI. In some embodiments, the at least one predetermined criterion is based at least in part on whether the triggering signal is received in a WD-specific search space. In some embodiments, the search space expansion is performed for downlink assignments, and is not performed for uplink grants. In some embodiments, the search space expansion is performed for uplink grants, and is not performed for downlink assignments. In some embodiments, the at least one predetermined criterion is based at least in part on a downlink control information, DCI, format. In some embodiments, the predetermined criteria are based on an aggregation level. In some embodiments, the search space expansion is configured to start only after the WD has transmitted an acknowledgement (ACK) or non-acknowledgement (NACK) for a first PDSCH transmission. In some embodiments, the at least one predetermined criterion is based at least in part on whether resources are allocated to the WD by the network node in response to a buffer status report sent by the WD to the network node. In some embodiments, the search space expansion is performed by repeating monitoring of search spaces by the WD. In some embodiments, the search space expansion is performed by repeating only search spaces using a same control resource set, CORESET. In some embodiments, the triggering signal is a PDSCH that uses medium access control, MAC, control elements, CE, to control start or stop of a search space expansion. In some embodiments, the triggering signal is a PDCCH that has at least one bit to indicate to the WD (22) when to start or stop a search space expansion. In some embodiments, the triggering signal is a PDCCH that uses a bit field to activate a remaining search space. In some embodiments, when the WD transmits on a physical uplink control channel (PUCCH), the WD subsequently switches to another search space configuration.

According to yet another aspect, a method in a WD includes receiving a triggering signal configured to trigger a search space expansion in the WD. The method also includes, when the triggering signal fulfills at least one predetermined criterion, performing a search space expansion, the predetermined criteria being based at least in part on at least one of PDCCH characteristics, PUSCH characteristics and PDSCH characteristics.

According to this aspect, in some embodiments, the at least one predetermined criterion is based at least in part on a PDCCH scrambled by a predetermined radio network temporary identifier, RNTI. In some embodiments, the at least one predetermined criterion is based at least in part on whether the triggering signal is received in a WD-specific search space. In some embodiments, the search space expansion is performed for downlink assignments, and is not performed for uplink grants. In some embodiments, the search space expansion is performed for uplink grants, and is not performed for downlink assignments. In some embodiments, the at least one predetermined criterion is based at least in part on a downlink control information, DCI, format. In some embodiments, the predetermined criteria are based on an aggregation level. In some embodiments, the search space expansion is configured to start only after the WD has transmitted an acknowledgement (ACK) or non-acknowledgement (NACK) for a first PDSCH transmission. In some embodiments, the at least one predetermined criterion is based at least in part on whether resources are allocated to the WD by the network node in response to a buffer status report sent by the WD to the network node. In some embodiments, the search space expansion is performed by repeating monitoring of search spaces by the WD. In some embodiments, the search space expansion is performed by repeating only search spaces using a same control resource set, CORESET. In some embodiments, the triggering signal is a PDSCH that uses medium access control, MAC, control elements, CE, to control start or stop of a search space expansion. In some embodiments, the triggering signal is a PDCCH that has at least one bit to indicate to the WD (22) when to start or stop a search space expansion. In some embodiments, the triggering signal is a PDCCH that uses a bit field to activate a remaining search space. In some embodiments, when the WD transmits on a physical uplink control channel (PUCCH), the WD subsequently switches to another search space configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

DETAILED DESCRIPTION

Figure 1:
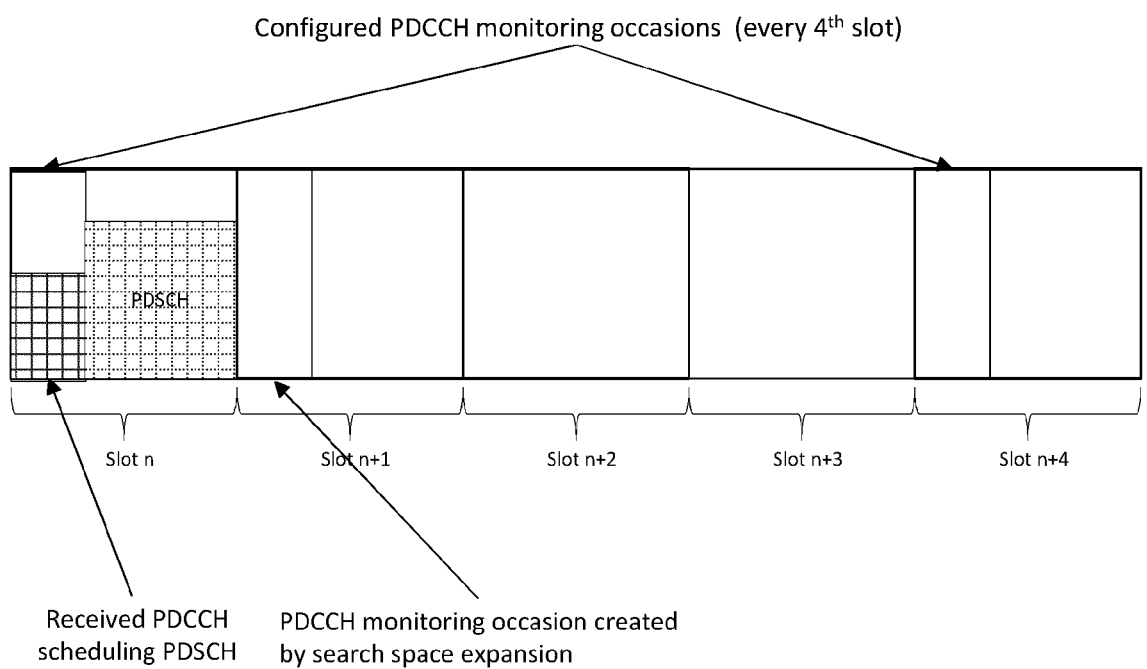
FIG. 1 is a timing diagram of a PDCCH monitoring occasion which is dynamically created in slot n+1 in response to a received PDCCH in slot n.

Before describing in detail exemplary embodiments, it is noted that the embodiments reside primarily in combinations of apparatus components and processing steps related to downlink control channel monitoring such as extended physical downlink control channel (PDCCH) monitoring. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may inter-operate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A better granularity when a PDCCH monitoring occasion is dynamically created (as compared with known solutions) is provided. This gives the network (NW), e.g., the network node, better control as to when the WD should monitor the PDCCH in a subsequent slot (despite not having a regular PDCCH search space configured) or not (and thus, enabling the WD to save power). Flexible configuration options for defining the time locations of the extension monitoring occasions and robustness against NW-WD mode assumption misalignment are described.

Figure 3:
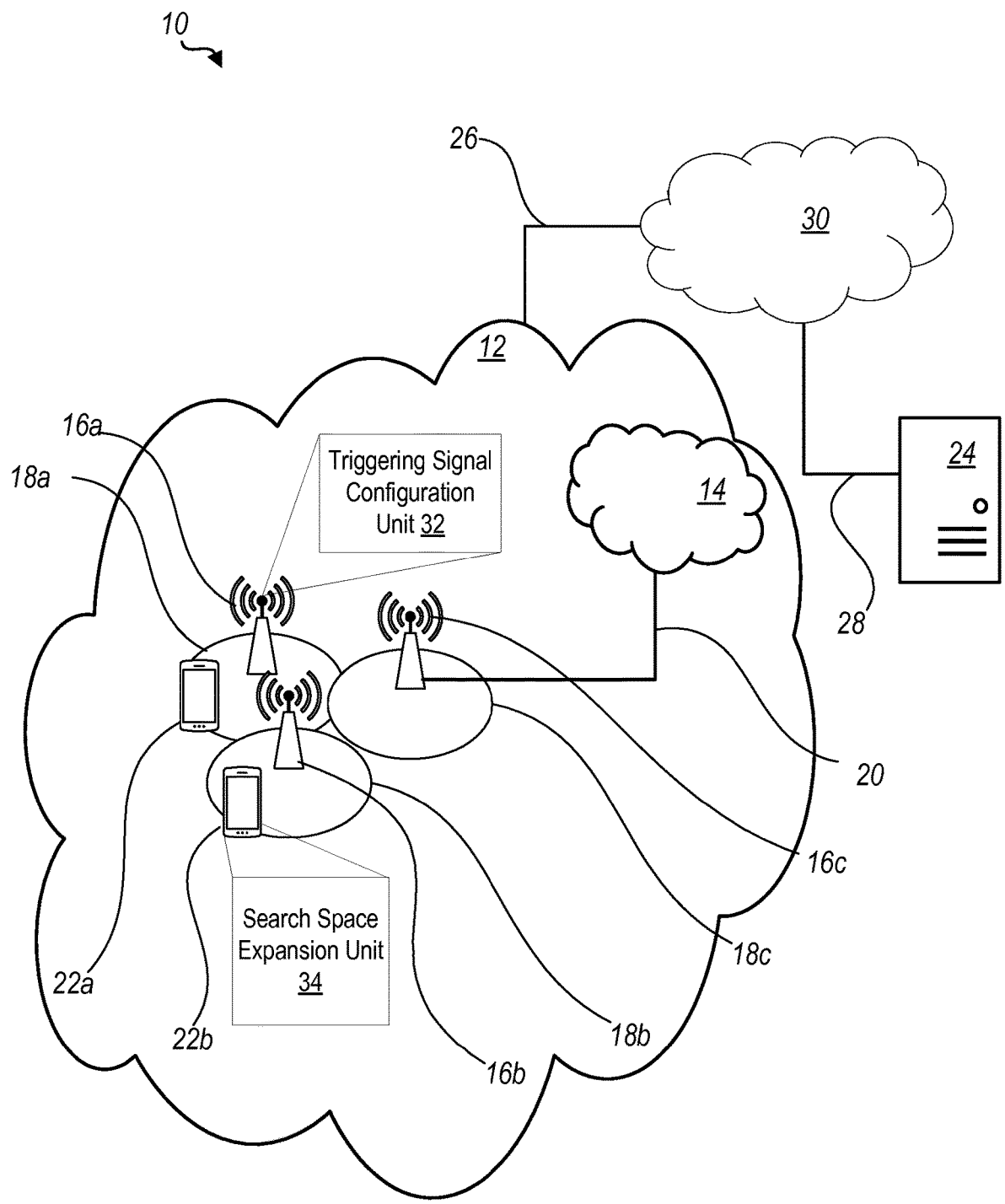
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a triggering signal configuration unit 32 which is configured to configure a triggering signal to conditionally trigger a search space expansion in the WD such that the triggering signal fulfills at least one predetermined criterion that is based at least in part on at least one of PDCCH characteristics, PUSCH characteristics and PDSCH characteristics. A wireless device 22 is configured to include a search space expansion unit 34 configured to, when the triggering PDCCH and/or PDSCH fulfills at least one predetermined criterion, perform a search space expansion, the at least one predetermined criterion being based at least in part on at least one of PDCCH characteristics, PUSCH characteristics and PDSCH characteristics.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include triggering signal configuration unit 32 which is configured to configure a triggering signal to conditionally trigger a search space expansion in the WD such that the triggering signal fulfills at least one predetermined criterion that is based at least in part on at least one of PDCCH characteristics, PUSCH characteristics and PDSCH characteristics.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include the search space expansion unit 34 which is configured to, when the triggering PDCCH and/or PDSCH fulfills at least one predetermined criterion, perform a search space expansion, the at least one predetermined criterion being based at least in part on at least one of PDCCH characteristics, PUSCH characteristics and PDSCH characteristics.

Figure 4:
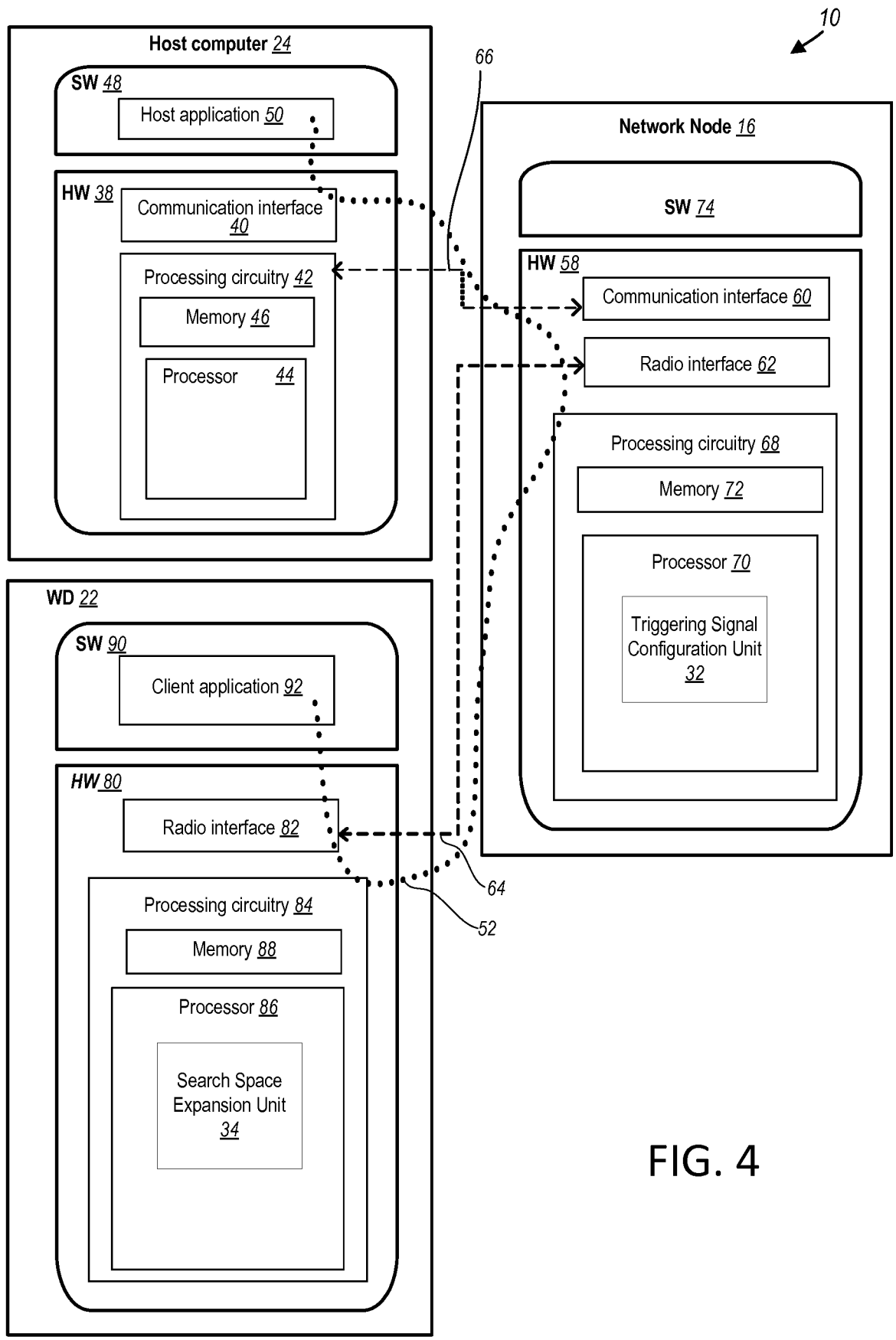
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 4.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as triggering signal configuration unit 32, and search space expansion unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 2:
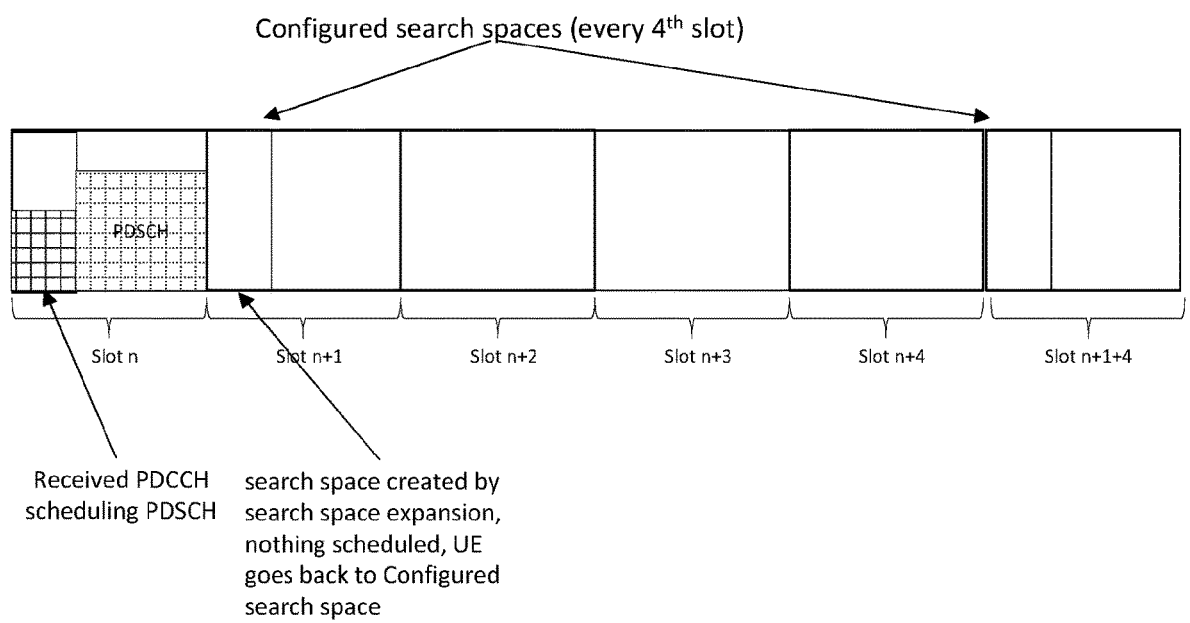
FIG. 2 is an alternate timing diagram of a PDCCH monitoring occasion which is dynamically created in slot n+1 in response to a received PDCCH in slot n, and showing return to a search configuration in slot n+1+4.
Figure 5:
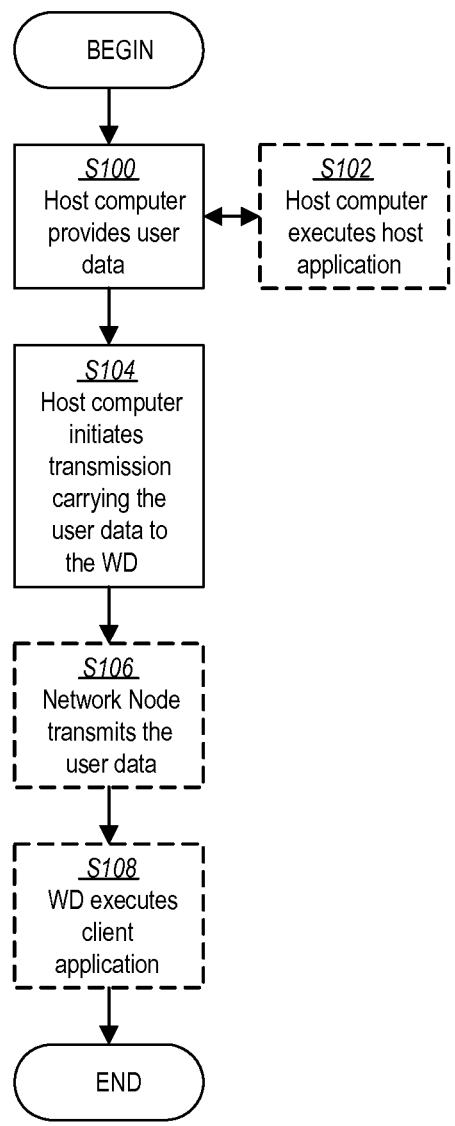
FIG. 5 is a flowchart illustrating exemplary methods implemented in a communication system including a host computer, a network node and a wireless device for executing a client application at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

Figure 6:
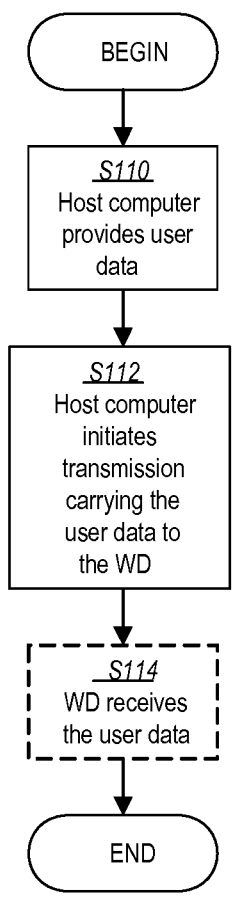
FIG. 6 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally, or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
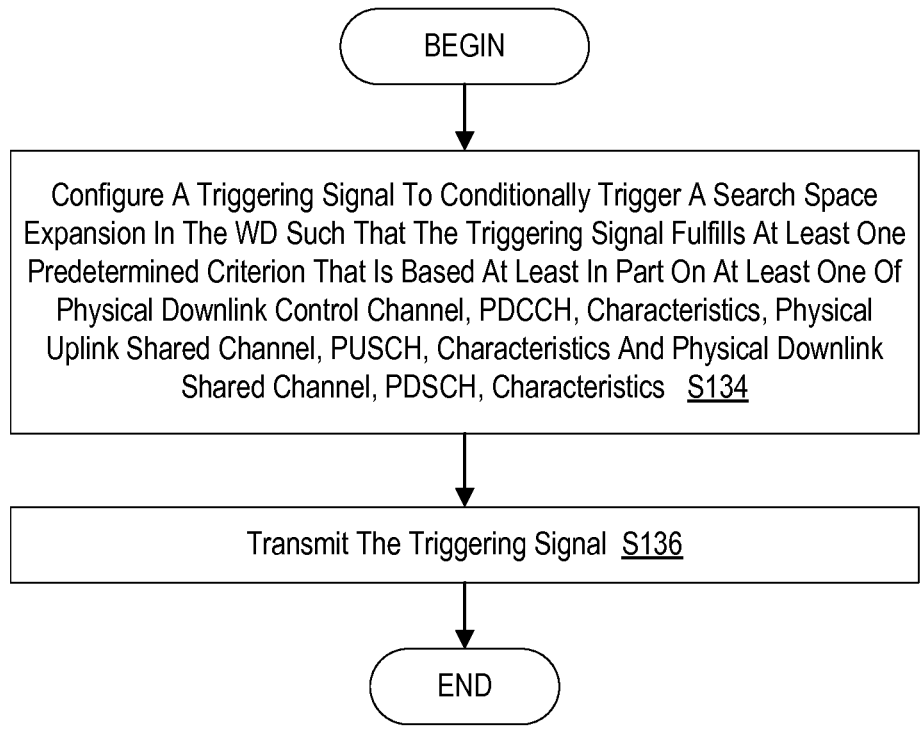
FIG. 9 is a flowchart of an exemplary process in a network node for configuring a search space expansion for extended PDCCH monitoring according to some embodiments of the present disclosure.

FIG. 9 is a flowchart of an exemplary process in a network node 16 according to principles set forth herein. One or more blocks described herein may be performed by one or more elements of network node 16 such as by one or more of processing circuitry 68 (including the triggering signal configuration unit 32), processor 70, radio interface 62 and/or communication interface 60. Network node 16 such as via processing circuitry 68 and/or processor 70 and/or radio interface 62 and/or communication interface 60 is configured to configure a triggering signal to conditionally trigger a search space expansion in the WD such that the triggering signal fulfills at least one predetermined criterion that is based at least in part on at least one of PDCCH characteristics, PUSCH characteristics and PDSCH characteristics (Block S134). The process also includes transmitting the triggering signal (Block S136).

Figure 10:
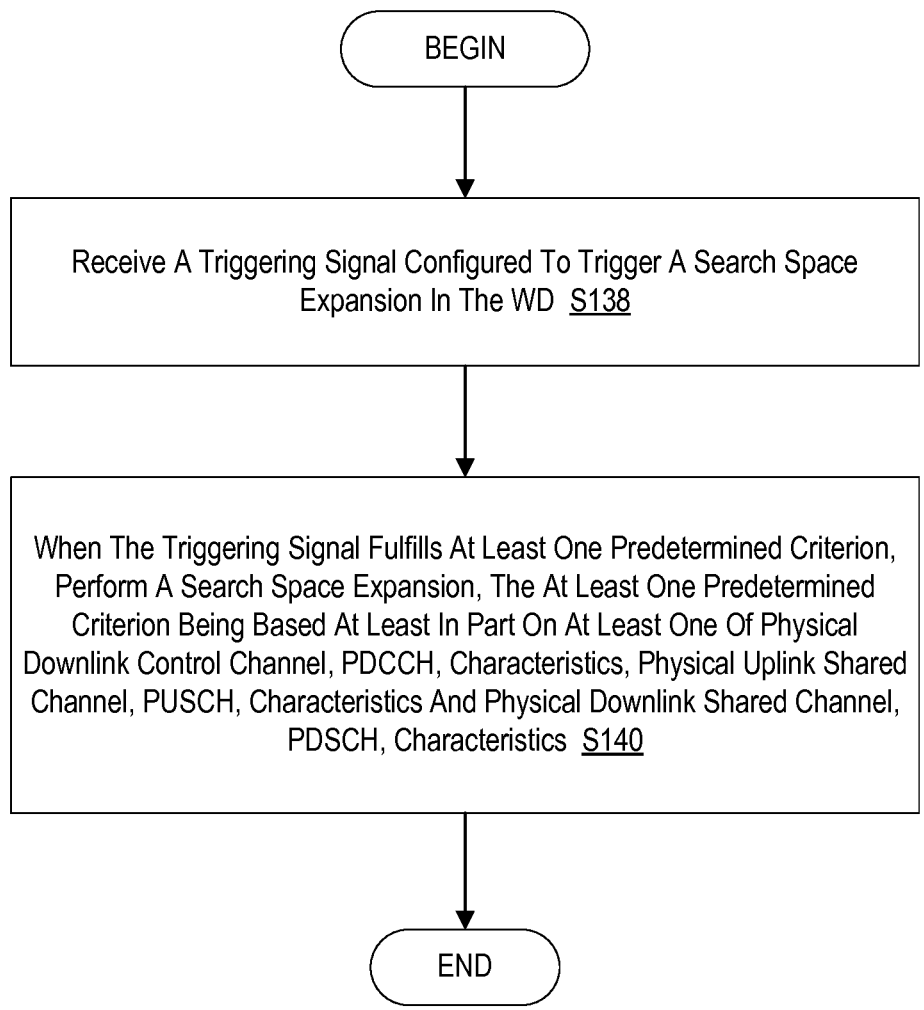
FIG. 10 is a flowchart of an exemplary process in a wireless device for configuring a search space expansion for extended PDCCH monitoring according to some embodiments of the present disclosure.

FIG. 10 is a flowchart of an exemplary process in a wireless device 22 according to some embodiments of the present disclosure. One or more blocks described herein may be performed by one or more elements of wireless device 22 such as by one or more of processing circuitry 84 (including the search space expansion unit 34), processor 86, radio interface 82 and/or communication interface 60. Wireless device 22 such as via processing circuitry 84 and/or processor 86 and/or radio interface 82 is configured to receive a triggering signal configured to trigger a search space expansion in the WD (Block S138). The process also includes, when the triggering signal fulfills at least one predetermined criterion, performing a search space expansion, the predetermined criteria being based at least in part on at least one of PDCCH characteristics, PUSCH characteristics and PDSCH characteristics (Block S140).

Having described the general process flow of arrangements of the disclosure and having provided examples of hardware and software arrangements for implementing the processes and functions of the disclosure, the sections below provide details and examples of arrangements for extended physical downlink control channel (PDCCH) monitoring.

In the following, the term "search space extension" is used when an additional search space is added after the search space that contained the received scheduling PDCCH to create an additional PDCCH monitoring occasion. The extra search space(s) can either occur later in the same slot or in (a) later slot(s). The received PDCCH that triggers the search space expansion is called the triggering PDCCH in the following discussion.

Search Space Extension when DCI, PDCCH or Search Space Meets Certain Characteristics RNTI-based: Here an extra PDCCH monitoring occasion may only be added when the triggering PDCCH fulfills certain criteria (as used herein, "criteria" refers to one or more criterion). These criteria could be configured or fixed in the standard. For example, depending on which RNTI has been used to schedule a WD 22, a search space expansion may be performed. If a PDSCH is received using a broadcast DCI, a search space extension may not be performed, while if the triggering PDCCH was scrambled with a unicast DCI, a search space expansion may be performed.

Furthermore, the extra monitoring occasions can occur based on RNTI and specific contents. For example, in case a PDCCH containing a DCI with CRC scrambled with P-RNTI includes Short Messages indicating the Public Warning System (PWS), search space expansion may be performed. A reason for this is that the original search space occasion might be too sparsely configured. In case of an emergency (e.g., commercial mobile alert system (CMAS)), it might be crucial for a WD 22 to be highly reachable (i.e., have dense PDCCH monitoring occasions) to be able to receive multiple sets of warning messages.

A WD 22 can also be configured with an RNTI for mobile broadband (MBB) and/or with an RNTI for ultra reliable low latency communications (URLLC). It may be assumed, in some embodiments, that the search spaces used for URLLC are already configured to fulfill the required URLLC latencies. Also, URLLC packets are typically small. In some embodiments, search space expansion for triggering PDCCH addressed to an URLLC RNTI may not be needed and may not be configured. Note that NR may not define a "URLLC" RNTI, but rather, may use an RNTI that may use a specific modulation and coding scheme (MCS) table suited for URLLC.

On the other hand, for MBB where latency may not be critical, a less frequent search space can be configured. However, once a terminal is scheduled, it may be preferable that enough resources can be made available to empty the buffer in a continuous session; a preferred setup could therefore be that PDCCH monitoring occasions do not occur in every slot, search space expansion is provided when required. If a WD 22 receives a PDCCH addressed to an RNTI typically used for MBB (e.g., C-RNTI) the WD 22 may perform search space expansion.

More generally, search space expansion may be performed for certain RNTIs and not other RNTIs. The RNTI that triggers a search space expansion can be configured.

Search space type-based: The search space expansion can also depend on whether the triggering PDCCH has been received in a common or WD 22 specific search space. Or, with a finer granularity, search space expansion can be configured for individual search spaces or CORESETs. This would give the network some control over when the WD 22 should perform extra PDCCH monitoring (at the cost of higher energy consumption) or when the WD 22 should follow its configured PDCCH monitoring occasions.

DL/UL based: Search space expansion can also be performed for DL assignments (DCI 1-0 and/or 1-1) but not UL grants (DCI 0-0 and/or 0-1), the other way around, or for both DL assignments and UL grants.

DCI format-based: Also, the DCI format of the triggering PDCCH can be used as differentiator of when to enable search space expansion and when not. For example, fallback DCI 0-0 and/or 0-1 might not trigger search space expansion while DCI 1-0 and/or 1-1 might. Also, this gives the network, e.g., network node 16, control over when WD 22 is expected to perform search space expansion and when not.

PDCCH parameter-based: Also, other PDCCH properties such as aggregation level can be used to trigger or not trigger search space expansion.

Scheduling time offset valued-based: Scheduling time offset values, i.e., K0, K1, K2, and aperiodicTriggeringOffset can be used by the network node 16 to inform the WD 22 about upcoming activity in time between PDSCH/PUSCH and channel state information reference signal (CSI-RS) reception and/or PUSCH/PUCCH transmissions. The same values can also be used in order to trigger search space expansion in one or more of upcoming slots. For example, by K0=0 the NW can indicate to the WD 22 to expand the search space for one or more of the next slots as probably the NW has some data to deliver with low latency requirements. Other values of K0 can indicate different modes. For example, with K0=2, the NW can indicate to the WD 22 to expand the search spaces every two other slots after reception of the PDSCH in the next 2 slots. Similar triggering definitions can be applied to the other scheduling time offset values, particularly K2. This triggering technique may also give the network node 16, the control of when and where the WD 22 should do a search space expansion or not. Particularly, since K0-K2 values can adopt almost any integer value (the set should be pre-configured by the NW), they may give the network node 16 a lot of flexibility in terms of defining the triggering PDCCH such that it can indicate a search space expansion as well as flexibly indicate the location of the next search space occasion(s) or the specific search space(s) in the following occasion(s).

Explicit signaling in DCI: Yet another possibility is to include a bit (or more than one bit) into the triggering PDCCH/DCI to signal search space expansion for the current time instance or to signal start or stop search space expansion for a time interval. More than one bit could be useful to control search space expansion, e.g., when and how many slots/occasions the search space should be extended with. As pointed out below in one aspect, the bit can also give the possibility to the NW, e.g., network node 16, to indicate a specific or set of specific search spaces for the next occasion(s). This gives the network node 16 the most degrees of freedom to control search space extension at the cost of slightly increased payload size. If buffers for the WD 22 are not yet empty, the network node 16 could signal to extend the search space, otherwise not, in some embodiments.

MAC CE: Yet another possibility is to control start/stop of search space expansion via medium access control (MAC) control elements (CEs).

Search Space Extension when PDSCH/PUSCH Meets Certain Characteristics

Data channel characteristics: Whether the search space expansion should be performed or not can also be based on PUSCH and/or PDSCH characteristics: If the network, e.g., network node 16, schedules a PDSCH with a transport block size less than a threshold, a bandwidth less than a threshold, a time duration less than threshold (all of which are indications of a small payload) the WD could assume the network has not more to transmit, i.e., search space expansion is not performed. On the other hand, if any of these metrics (or specific combinations of these metrics) exceeds threshold value(s), the WD can assume network node 16 has a large amount of data to transmit and search space expansion may be performed. Any one or more of the above mentioned thresholds could be fixed or configurable.

Buffer status: If WD 22 transmitted a buffer status report and the network node 16 has not yet provided the WD 22 with sufficient UL resources to empty its buffers (the buffers may be assumed to have the size reported in the buffer status report), search space expansion may be performed after the WD 22 receives a triggering PDCCH containing an UL grant. If the network, e.g., network node 16, already provided the WD 22 with UL resources equal to or larger than the reported buffer status, search space expansion might not be performed.

Details of Search Space Expansion

When a search space expansion is triggered, different ways that the search space is extended can be envisioned: All the search spaces the WD 22 monitors in the current PDCCH monitoring occasions or slot may be repeated. Alternatively, only the current search space or all search spaces using the same CORESET may be repeated. In one aspect, the repetition rate may be configurable. I.e., the repetition is not necessarily in every slot but rather according to a preconfigured value, in some embodiments.

In the expanded search space(s), the WD 22 can monitor all DCI formats and RNTI and aggregation levels which are configured to monitor in the slot/PDCCH monitoring occasions/search space in which the Triggering PDCCH is received. Alternatively, the WD 22 only monitors a subset. In some embodiments, all properties of the slot/PDCCH monitoring occasions (with respect to control signaling reception) within which the triggering PDCCH has been received may be copied into the dynamically added slot/PDCCH monitoring occasion.

Instead of deriving the search space configuration from the slot/PDCCH monitoring occasions/search space within which the triggering PDCCH has been received, the search space expansion could have its own independent configuration, i.e., the WD 22 has a search space configuration dedicated for the expanded search space.

The search space can also be expanded into one additional slot/PDCCH monitoring occasion or multiple. The slot(s)/PDCCH monitoring occasion(s) can start with the next slot/PDCCH monitoring occasion or multiple slots/PDCCH monitoring occasions later. The starting position of the extension occasions can also depend on the length of the data scheduled by the triggering PDCCH, e.g., that the additional PDCCH monitoring occasion(s) start after the data transfer has ended. In case of multiple slots/PDCCH monitoring occasions to extend, the monitoring occasions can be contiguous in time or not.

In one embodiment, only the original triggering PDCCH induces one or more extension occasions according to a configured pattern. In another embodiment, each scheduling PDCCH received in an extension occasion in turn becomes a triggering PDCCH and induces additional extension occasions.

In another aspect, the triggering PDCCH activates a preconfigured search space via a search space indicator. For example, a WD 22 can according to the current specification be configured with up to ten search spaces per Bandwidth Part. Apart from the search space in operation, a triggering PDCCH may use three bits, for example, to dynamically activate (expand by using) one of the remaining search spaces. Furthermore, the expansion can be done in several steps in a cascading manner where it is possible for a PDCCH to, after a certain time, point to another search space activation/expansion, where in its turn it is possible for a PDCCH to, after a certain time, to point to yet another search space expansion (e.g., more and more sparse in time). A search space expansion can be triggered if the triggering PDCCH is received in a configured (i.e., not in a search space expansion search space/PDCCH monitoring occasions) search space/PDCCH monitoring occasions. Alternatively, the search space expansion can also be triggered when a PDCCH is received in an expanded search space/PDCCH monitoring occasion.

Avoiding NW-WD Misalignment

Since the extension occasions are associated with PDCCH transmission (from the network node 16 viewpoint) and reception (from the WD 22 viewpoint), there may exist a risk that the assumptions become incompatible if the WD 22 does not successfully detect a triggering PDCCH transmitted by the network node 16. In this case, the network node 16 assumption that the WD 22 will be monitoring the extension occasions may be erroneous. Furthermore, no acknowledgement-non-acknowledgement (ACK-NACK) signaling and hybrid automatic repeat request (HARQ)-based repair may be performed by the WD 22 which may lead to higher-layer retransmissions.

In order to reduce the probability of such misalignment, the extension occasions may be defined to occur only after the WD 22 has transmitted, via the radio interface 82, the ACK or NACK (even in case of NACK after it successfully decoded the PDCCH) for the PDSCH related to the triggering PDCCH. When the ACK or NACK has been received by the network node 16 in the UL, the network node 16 will consider the following slot(s) as opportunities for additional PDCCH transmission according to the extension occasion principles. In one embodiment, the extension occasion timing is defined for the WD 22 as one or more slots after ACK/NACK transmission, to allow time for the network, e.g., network node 16, to schedule data in that occasion. For example, if K0=0 is used as triggering PDCCH for search space expansion in slot n for the next slot after ACK/NACK, and K1 is configured as 1, the WD 22 may automatically understand that it should first send the ACK/NACK in slot n+1, and then monitor PDCCH in slot n+2 because of K0=0 in slot n. In another embodiment, a time offset from triggering PDCCH to an extension PDCCH monitoring occasion is defined, preferably a number of slots that exceeds the worst-case PDCCH-to-ACK/NACK delay for the current WD 22 operating mode.

For UL transmissions, the scheduled PUSCH can be used by the network node 16 to determine whether the PDCCH with the UL grant has been successfully received or not: if the WD 22 does not receive the PDCCH it also does not transmit the PUSCH. If the WD 22 receives the PDCCH, it will send a PUSCH and perform search space expansion. Even if network node 16 cannot successfully decode the PUSCH, it might still be able to differentiate if no PUSCH has been transmitted or if a PUSCH has been transmitted but the network could not decode it. In case a PUSCH is received (whether it is successfully decoded or not) the network may have the confirmation that the WD 22 detected the PDCCH and can use the extended search space.

If no ACK or NACK is received, no extension occasions are scheduled, in some embodiments. (In addition, the conventional procedure in relation to repairing the triggering PDCCH transmission may typically be performed.)

Note that the ACK transmission by the WD 22 may also not be received successfully by the NW, e.g., network node 16, also leading to a misalignment. However, the consequences of that misalignment may be that the WD 22 will unnecessarily monitor additional PDCCH occasions, but no data loss occurs.

Configuring Extension Mechanism Parameters

The parameters related to the numerous embodiments above, e.g., the number of extension occasions, their time relations, and other parameters may be static or dynamic, and in typical embodiments, a mix of the two. The WD 22 may be configured with static (infrequently-modified) parameters, e.g., via RRC signaling and/or via system information transmission. Dynamic (frequently-modified) parameters and mode switch indicators may be provided, e.g., via MAC CE or DCI signaling.

Thus, when a WD 22 receives, via radio interface 82, a PDCCH scheduling of the UL or DL, a search space may be dynamically generated in the next slot(s) or PDCCH monitoring occasions (search space expansion). The above discussion provides examples of when a search space expansion is performed. When a search space expansion is performed may depend on which search space/CORESET the PDCCH has been received in, and/or the DCI format or RNTI carrier by the DCI, etc.

Thus, according to one aspect, a network node 16 configured to communicate with a WD 22 is provided. The network node 16 includes processing circuitry 68 configured to configure a triggering signal to conditionally trigger a search space expansion in the WD 22 such that the triggering signal fulfills at least one predetermined criterion that is based at least in part on at least one of PDCCH characteristics, PUSCH characteristics and PDSCH characteristics. A radio interface 62 in communication with the processing circuitry 68 is configured to transmit the triggering signal.

According to this aspect, in some embodiments, the triggering signal is included in a PDSCH using medium access control, MAC, control elements, CE, to control start or stop of a search space expansion. In some embodiments, the at least one predetermined criterion is based at least in part on a PDCCH scrambled by a predetermined radio network temporary identifier, RNTI. In some embodiments, the network node 16 is further configured to use scheduling time offsets to one of: inform the WD 22 about upcoming activity in time; and to cause the WD 22 to perform search space expansion in one or more upcoming slots. In some embodiments, the triggering signal is a PDCCH that has at least one bit to indicate to the WD 22 when to start or stop a search space expansion. In some embodiments, the triggering signal is a PDCCH that uses a bit field to activate a remaining search space.

According to another aspect, a method implemented in a network node 16 includes configuring a triggering signal to conditionally trigger a search space expansion in the WD 22 such that the triggering signal fulfills at least one predetermined criterion that is based at least in part on at least one of PDCCH characteristics, PUSCH characteristics and PDSCH characteristics, and transmitting the triggering signal.

According to this aspect, in some embodiments, the transmitting of the triggering signal is in a PDSCH that uses medium access control, MAC, control elements, CE, to control start or stop of a search space expansion. In some embodiments, the at least one predetermined criterion is based at least in part on a PDCCH scrambled by a predetermined radio network temporary identifier, RNTI. In some embodiments, the method further includes using scheduling time offsets to one of inform the WD 22 about upcoming activity in time and to cause the WD 22 to perform search space expansion in one or more upcoming slots. In some embodiments, the triggering signal is a PDCCH that has at least one bit to indicate to the WD 22 when to start or stop a search space expansion. In some embodiments, the triggering signal is a PDCCH that uses a bit field to activate a remaining search space.

According to yet another aspect, a WD 22 is configured to communicate with a network node 16. The WD 22 includes a radio interface 82 configured to receive a triggering signal configured to trigger a search space expansion in the WD 22. The WD 22 also includes processing circuitry 84 in communication with the radio interface. The processing circuitry 84 is configured to: when the triggering signal fulfills at least one predetermined criterion, perform a search space expansion, the at least one predetermined criterion being based at least in part on at least one of physical downlink control channel, PDCCH, characteristics, physical uplink shared channel, PUSCH, characteristics and physical downlink shared channel, PDSCH, characteristics.

According to this aspect, in some embodiments, the at least one predetermined criterion is based at least in part on a PDCCH scrambled by a predetermined radio network temporary identifier, RNTI. In some embodiments, the at least one predetermined criterion is based at least in part on whether the triggering signal is received in a WD-specific search space. In some embodiments, the search space expansion is performed for downlink assignments, and is not performed for uplink grants. In some embodiments, the search space expansion is performed for uplink grants, and is not performed for downlink assignments. In some embodiments, the at least one predetermined criterion is based at least in part on a downlink control information, DCI, format. In some embodiments, the predetermined criteria are based on an aggregation level. In some embodiments, the search space expansion is configured to start only after the WD 22 has transmitted an acknowledgement (ACK) or non-acknowledgment (NACK) for a first physical downlink shared channel (PDSCH) transmission. In some embodiments, the at least one predetermined criterion is based at least in part on whether resources are allocated to the WD 22 by the network node 16 in response to a buffer status report sent by the WD 22 to the network node 16. In some embodiments, the search space expansion is performed by repeating monitoring of search spaces by the WD 22. In some embodiments, the search space expansion is performed by repeating only search spaces using a same control resource set, CORESET. In some embodiments, the triggering signal is a PDSCH that uses medium access control, MAC, control elements, CE, to control start or stop of a search space expansion. In some embodiments, the triggering signal is a PDCCH that has at least one bit to indicate to the WD (22) when to start or stop a search space expansion. In some embodiments, the triggering signal is a PDCCH that uses a bit field to activate a remaining search space. In some embodiments, when the WD transmits on a physical uplink control channel (PUCCH), the WD subsequently switches to another search space configuration.

According to yet another aspect, a method in a WD 22 includes receiving a triggering signal configured to trigger a search space expansion in the WD 22. The method also includes, when the triggering signal fulfills at least one predetermined criterion, performing a search space expansion, the predetermined criteria being based at least in part on at least one of PDCCH characteristics, PUSCH characteristics and PDSCH characteristics.

According to this aspect, in some embodiments, the at least one predetermined criterion is based at least in part on a PDCCH scrambled by a predetermined radio network temporary identifier, RNTI. In some embodiments, the at least one predetermined criterion is based at least in part on whether the triggering signal is received in a WD-specific search space. In some embodiments, the search space expansion is performed for downlink assignments, and is not performed for uplink grants. In some embodiments, the search space expansion is performed for uplink grants, and is not performed for downlink assignments. In some embodiments, the at least one predetermined criterion is based at least in part on a downlink control information, DCI, format. In some embodiments, the predetermined criteria are based on an aggregation level. In some embodiments, the search space expansion is configured to start only after the WD 22 has transmitted an acknowledgement (ACK) or non-acknowledgement (NACK) for a first physical downlink shared channel (PDSCH) transmission. In some embodiments, the at least one predetermined criterion is based at least in part on whether resources are allocated to the WD 22 by the network node 16 in response to a buffer status report sent by the WD 22 to the network node 16. In some embodiments, the search space expansion is performed by repeating monitoring of search spaces by the WD 22. In some embodiments, the search space expansion is performed by repeating only search spaces using a same control resource set, CORESET. In some embodiments, the triggering signal is a PDSCH that uses medium access control, MAC, control elements, CE, to control start or stop of a search space expansion. In some embodiments, the triggering signal is a PDCCH that has at least one bit to indicate to the WD (22) when to start or stop a search space expansion. In some embodiments, the triggering signal is a PDCCH that uses a bit field to activate a remaining search space. In some embodiments, when the WD transmits on a physical uplink control channel (PUCCH), the WD subsequently switches to another search space configuration. This covers some embodiments where a PUCCH scheduling request does not affect WD latency.

SOME EMBODIMENTS

Embodiment A1. A network node configured to communicate with a wireless device (WD), the network node configured to, and/or comprising a radio interface and/or comprising processing circuitry configured to:
configure a triggering physical downlink control channel, PDCCH, to conditionally trigger a search space expansion in the WD; and
optionally transmit the triggering PDCCH.

Embodiment A2. The network node of Embodiment A1, wherein the search space expansion adds an additional search space after a search space that contains the PDCCH.

Embodiment A3. The network node of Embodiment A1, wherein the triggering PDCCH is configured based on a radio network temporary identifier, RNTI.

Embodiment A4. The network node of Embodiment A1, wherein the network node is further configured to use scheduling time offsets to inform the WD about upcoming activity in time and/or to cause the WD to perform search space expansion in one or more upcoming slots.

Embodiment A5. The network node of Embodiment A1, wherein the triggering PDCCH has a bit to indicate to the WD when to start or stop a search space expansion.

Embodiment A6. The network node of Embodiment A1, wherein the triggering PDCCH uses medium access control, MAC, control elements, CE, to control start or stop of a search space expansion.

Embodiment B1. A method implemented in a network node, the method comprising
configuring a triggering physical downlink control channel, PDCCH, to conditionally trigger a search space expansion in the WD; and
optionally transmitting the triggering PDCCH.

Embodiment B2. The method of Embodiment B1, wherein the search space expansion adds an additional search space after a search space that contains the PDCCH.

Embodiment B3. The method of Embodiment B1, wherein the triggering PDCCH is configured based on a radio network temporary identifier, RNTI.

Embodiment B4. The method of Embodiment B1, wherein the network node is further configured to use scheduling time offsets to inform the WD about upcoming activity in time and/or to cause the WD to perform search space expansion in one or more upcoming slots.

Embodiment B5. The method of Embodiment B1, wherein the triggering PDCCH has a bit to indicate to the WD when to start or stop a search space expansion.

Embodiment B6. The method of Embodiment B1, wherein the triggering PDCCH uses medium access control, MAC, control elements, CE, to control start or stop of a search space expansion.

Embodiment C1. A wireless device (WD) configured to communicate with a network node, the WD configured to, and/or comprising a radio interface and/or processing circuitry configured to:

receive a triggering physical downlink control channel, PDCCH, configured to conditionally trigger a search space expansion in the WD; and when the triggering PDCCH fulfills predetermined criteria, perform a search space expansion.

Embodiment C2. The WD of Embodiment C1, wherein the predetermined criteria is based on a radio network temporary identifier, RNTI, used to schedule the WD.

Embodiment C3. The WD of Embodiment C2, wherein, when a PDCCH containing a downlink control information, DCI, with cyclic redundancy check, CRC, scrambled with an RNTI includes short messages indicating a public warning system, PWS, search space expansion is performed by the WD.

Embodiment C4. The WD of Embodiment C2, wherein, when the RNTI is used for mobile broad band, MBB, search space expansion is performed by the WD.

Embodiment C5. The WD of Embodiment C1, wherein the predetermined criteria is based on whether the triggering PDCCH is received in a WD-specific search space.

Embodiment C6. The WD of Embodiment C1, wherein the search space expansion is performed for downlink assignments, but not uplink grants.

Embodiment C7. The WD of Embodiment C1, wherein the predetermined criteria is based on a downlink control information, DCI, format.

Embodiment C8. The WD of Embodiment C1, wherein the predetermined criteria is based on an aggregation level.

Embodiment C9. The WD of Embodiment C1, wherein the predetermined criteria is based on physical uplink shared channel, PUSCH, and/or physical downlink shared channel, PDSCH, characteristics.

Embodiment C10. The WD of Embodiment C1, wherein the predetermined criteria is based on whether resources are allocated to the WD by the network node in response to a buffer status report sent by the WD to the network node.

Embodiment C11. The WD of Embodiment C1, wherein the search space expansion is performed by repeating monitoring of search spaces by the WD.

Embodiment C12. The WD of Embodiment C1, wherein the search space expansion is performed by repeating only search spaces using a same control resource set, CORESET.

Embodiment D1. A method implemented in a wireless device (WD), the method comprising:

receiving a triggering physical downlink control channel, PDCCH, configured to conditionally trigger a search space expansion in the WD; and when the triggering PDCCH fulfills predetermined criteria, performing a search space expansion.

Embodiment D2. The method of Embodiment D1, wherein the predetermined criteria is based on a radio network temporary identifier, RNTI, used to schedule the WD.

Embodiment D3. The method of Embodiment D2, wherein, when a PDCCH containing a downlink control information, DCI, with cyclic redundancy check, CRC, scrambled with an RNTI includes short messages indicating a public warning system, PWS, search space expansion is performed by the WD.

Embodiment D4. The method of Embodiment D2, wherein, when the RNTI is used for mobile broad band, MBB, search space expansion is performed by the WD.

Embodiment D5. The method of Embodiment D1, wherein the predetermined criteria is based on whether the triggering PDCCH is received in a WD-specific search space.

Embodiment D6. The method of Embodiment D1, wherein the search space expansion is performed for downlink assignments, but not uplink grants.

Embodiment D7. The method of Embodiment D1, wherein the predetermined criteria is based on a downlink control information, DCI, format.

Embodiment D8. The method of Embodiment D1, wherein the predetermined criteria is based on an aggregation level.

Embodiment D9. The method of Embodiment D1, wherein the predetermined criteria is based on physical uplink shared channel, PUSCH, and/or physical downlink shared channel, PDSCH, characteristics.

Embodiment D10. The method of Embodiment D1, wherein the predetermined criteria is based on whether resources are allocated to the WD by the network node in response to a buffer status report sent by the WD to the network node.

Embodiment D11. The method of Embodiment D1, wherein the search space expansion is performed by repeating monitoring of search spaces by the WD.

Embodiment D12. The method of Embodiment D1, wherein the search space expansion is performed by repeating only search spaces using a same control resource set, CORESET.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| CORESET | Control Channel Resource Set |
| CRC | Cyclic Redundancy Check |
| DCI | Downlink Control Information |
| DRX | Discontinues Reception |
| MBB | Mobile Broadband |
| MCS | Modulation and Coding Scheme |

-continued

| Abbreviation | Explanation |
| --- | --- |
| PDCCH | Physical Downlink Control Channel |
| PDSCH | Physical Shared Data Channel |
| PUSCH | Physical Uplink Shared Channel |
| RNTI | Radio Network Temporary Identifier |
| RRC | Radio Resource Control |
| SI | System Information |
| URLLC | Ultra Low Latency High Reliability Communication |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device (WD), the network node comprising:
 processing circuitry configured to:
  configure a triggering signal to conditionally trigger a search space expansion in the WD such that the triggering signal fulfills at least one predetermined criterion that is based at least in part on:
   at least one of physical downlink control channel, PDCCH, characteristics, physical uplink shared channel, PUSCH, characteristics and physical downlink shared channel, PDSCH, characteristics; and
   a first PDCCH characteristic of the PDCCH characteristics, the first PDCCH characteristic including a PDCCH scrambled by a predetermined radio network temporary identifier, RNTI; and
 a radio interface in communication with the processing circuitry, the radio interface configured to transmit the triggering signal.

2. A method implemented in a network node, the method comprising
 configuring a triggering signal to conditionally trigger a search space expansion in the WD such that the triggering signal fulfills at least one predetermined criterion that is based at least in part on:
  at least one of physical downlink control channel, PDCCH, characteristics, physical uplink shared channel, PUSCH, characteristics and physical downlink shared channel, PDSCH, characteristics; and
  a first PDCCH characteristic of the PDCCH characteristics, the first PDCCH characteristic including a PDCCH scrambled by a predetermined radio network temporary identifier, RNTI; and
 transmitting the triggering signal.

3. The method of claim 2, wherein the transmitting of the triggering signal is in a PDSCH that uses medium access control, MAC, control elements, CE, to control start or stop of the search space expansion.

4. The method of claim 2, further comprising using scheduling time offsets to at least one of inform the WD about upcoming activity in time and to cause the WD to perform the search space expansion in one or more upcoming slots.

5. The method of claim 2, wherein the triggering signal is a PDCCH that has at least one bit to indicate to the WD when to start or stop the search space expansion.

6. The method of claim 2, wherein the triggering signal is a PDCCH that uses a bit field to activate a remaining search space.

7. A wireless device (WD) configured to communicate with a network node, the WD comprising:
a radio interface configured to:
receive a triggering signal configured to trigger a search space expansion in the WD; and
processing circuitry in communication with the radio interface, the processing circuitry configured to:
when the triggering signal fulfills at least one predetermined criterion, perform the search space expansion, the at least one predetermined criterion being based at least in part on:
at least one of physical downlink control channel, PDCCH, characteristics, physical uplink shared channel, PUSCH, characteristics and physical downlink shared channel, PDSCH, characteristics; and
a first PDCCH characteristic of the PDCCH characteristics, the first PDCCH characteristic including a PDCCH scrambled by a predetermined radio network temporary identifier, RNTI.

8. A method in a wireless device, WD, the method comprising:
receiving a triggering signal configured to trigger a search space expansion in the WD; and
when the triggering signal fulfills at least one predetermined criterion, performing the search space expansion, the at least one predetermined criteria criterion being based at least in part on:
at least one of physical downlink control channel, PDCCH, characteristics, physical uplink shared channel, PUSCH, characteristics and physical downlink shared channel, PDSCH, characteristics; and
a first PDCCH characteristic of the PDCCH characteristics, the first PDCCH characteristic including a PDCCH scrambled by a predetermined radio network temporary identifier, RNTI.

9. The method of claim 8, wherein the at least one predetermined criterion is based at least in part on whether the triggering signal is received in a WD-specific search space.

10. The method of claim 8, wherein the search space expansion is performed for downlink assignments, and is not performed for uplink grants.

11. The method of claim 8, wherein the search space expansion is performed for uplink grants, and is not performed for downlink assignments.

12. The method of claim 8, wherein the at least one predetermined criterion is based at least in part on a downlink control information, DCI, format.

13. The method of claim 8, wherein the at least one predetermined criterion is based on an aggregation level.

14. The method of claim 8, wherein the search space expansion is configured to start only after the WD has transmitted an acknowledgement, ACK, or a non-acknowledgement, NACK, for a first physical downlink shared channel, PDSCH, transmission.

15. The method of claim 8, wherein the at least one predetermined criterion is based at least in part on whether resources are allocated to the WD by the network node in response to a buffer status report sent by the WD to the network node.

16. The method of claim 8, wherein the search space expansion is performed by repeating monitoring of search spaces by the WD.

17. The method of claim 8, wherein the search space expansion is performed by repeating only search spaces using a same control resource set, CORESET.

18. The method of claim 8, wherein the triggering signal is a PDSCH that uses medium access control, MAC, control elements, CE, to control start or stop of the search space expansion.

19. The method of claim 8, wherein the triggering signal is a PDCCH that has at least one bit to indicate to the WD when to start or stop the search space expansion.

20. The method of claim 8, wherein the triggering signal is a PDCCH that uses a bit field to activate a remaining search space.

21. The method of claim 8, wherein, when the WD transmits on a physical uplink control channel, PUCCH, the WD subsequently switches to another search space configuration.

* * * * *